INVENTORS
Eugene A. Graff and
Gilbert P. Mortensen

United States Patent Office 3,597,366
Patented Aug. 3, 1971

3,597,366
HALOPHOSPHATE PHOSPHOR PROCESS
Eugene A. Graff, Cedar Grove, and Gilbert P. Mortensen, Livingston, N.J., assignors to Westinghouse Electric Corporation, Pittsburgh, Pa.
Filed Dec. 30, 1968, Ser. No. 787,978
Int. Cl. C09k 1/36
U.S. Cl. 252—301.4P
2 Claims

ABSTRACT OF THE DISCLOSURE

A method of processing halophosphate phosphor to improve the performance of a fluorescent lamp which incorporates the phosphor. The phosphor is acid washed and then separated from the washing solution by utilizing a dynamic vacuum in conjunction with a filter. Rinsing of the phosphor is similarly conducted until the pH of the rinse water is above a predetermined value to insure that substantially all acid is removed. This provides the dual beneficial effect of speeding up the phosphor processing and improving the performance of the lamps which incorporate the phosphor.

BACKGROUND OF THE INVENTION

In the processing of calicum halophosphate phosphor for use in fluorescent lamps, it is well known that an acid washing of the formed phosphor can enhance the luminous brightness. In all acid washing processes of the prior art, a certain portion of residual acid remains with the washed material, even after it has been repeatedly water washed in attempts to remove the residual acid. Repeated water washing can lower the residual acid content to some degree, but numerous time consuming washings preclude manufacturing efficiency. Also, repeated washings generally result in loss of some amount of phosphor material which is carried away with the water wash.

SUMMARY OF THE INVENTION

It is an object of the invention to provide a method of acid washing calicum halophosphate phosphor which allows for efficient manufacturing operation and for an improved luminous performance of lamps incorporating the phosphor.

It is another object of the invention to provide a method of phosphor processing whereby the loss of phosphor material is minimized.

It is still another object of the invention to provide a method of phosphor processing whereby the residual acid content remaining in the phosphor after acid washing is minimized.

These objects and others which will become apparent as the description proceeds are achieved by adding calcium halophosphate phosphor to an acid washing solution forming a slurry, which is agitated to acid wash the phosphor. This slurry is fed onto a filter having dynamic vacuum producing means operatively associated with the underside of the filter, which maintains a partial vacuum upon the underside of the filter, whereby the substantial portion of the acid solution is rapidly removed and separated from the phosphor. The phosphor remains disposed on the upper side of the filter. The phosphor material is then flood rinsed by adding a substantial volume of deionized water to inundate the phosphor material. The rinse water is drawn through the phosphor material by the dynamic vacuum producing means associated with the underside of the filter, thereby removing substantially all of the residual acid. The flood-rinsing is continued until the pH of the rinse water drawn through the filter is pH 4.2 or greater. Preferably the phosphor material is then resuspended in water and the resulting slurry is fed to a high temperature air stream to dry the phosphor and insure its being in a fluffy state for application in fluorescent lamp manufacture.

DESCRIPTION OF THE PREFERRED EMBODIMENT

Figure 1:
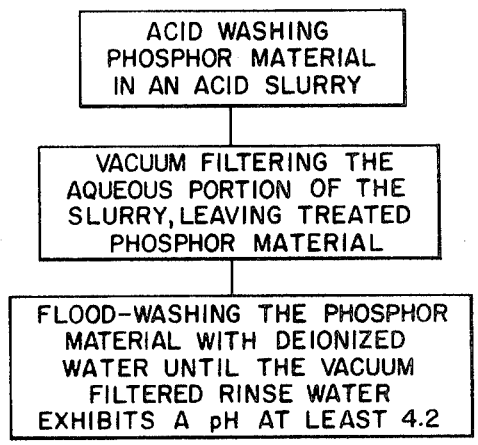
FIG. 1 is a block diagram illustrating the steps of the present invention.
Figure 2:
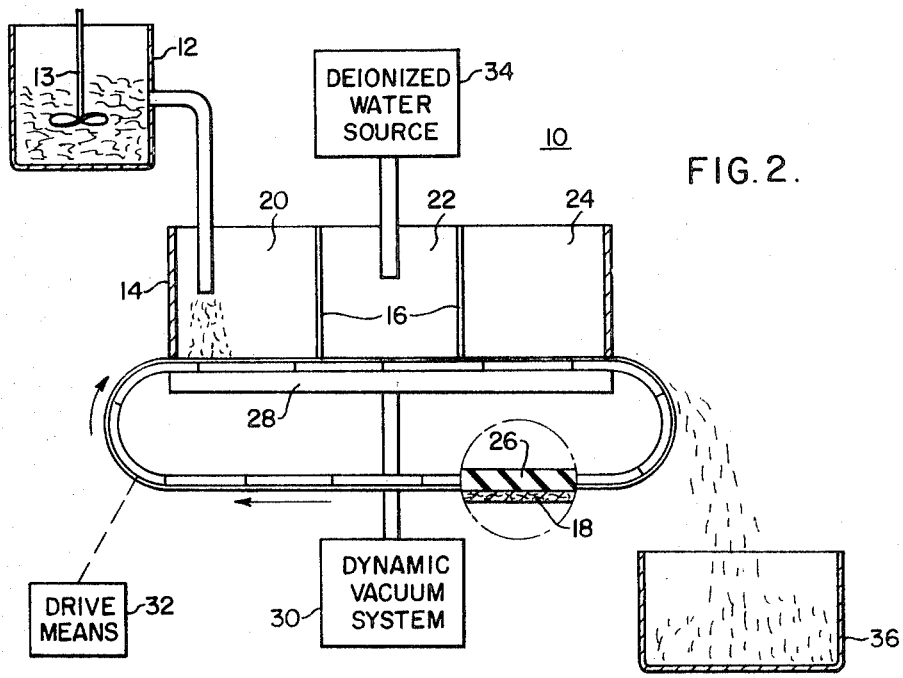
FIG. 2 is a schematic view of the filtration system used in practicing the preferred embodiment of the present invention.

The method of preparation of calcium halophosphate phosphor is well known, and conventionally the raw mix is fired for a predetermined period to provide a luminescent material. The phosphor is cooled and milled to insure that the material is in a finely divided particulate state. The milling can also be carried out with an amount of deionized water added. The resulting milled slurry is then thoroughly mixed with a dilute solution of acid, for example with nitric acid, to form an acid slurry that is about 0.1 normal. This 0.1 normal acid solution is stirred and agitated for example for about one hour to insure complete washing treatment of the phosphor material. As an example, 480 kg. of calicum halophosphate phosphor is milled with about 185 liters of deionized water, after which about 310 liters of dilute nitric acid solution is added to form an acid slurry having about a 0.1 normal concentration. The normality of the foregoing acid solution can be varied. The acid slurry is then ready for a final processing to remove the nitric acid and render the phosphor ready for production of fluorescent lamps. The basic steps of the present method are shown in block diagram in FIG. 1. It has been found advantageous in practicing the method of the present invention to utilize a continuous filter device, shown schematically in FIG. 2, and such apparatus is generally known for processing materials other than phosphors. Other continuous vacuum filtration systems could likewise be used in practicing the present invention. In FIG. 2, the continuous filter system 10 has fed to it the phosphor-containing acid slurry from slurry container 12 which is provided with an agitator 13. By way of example, the phosphor slurry is agitated for about one hour. The slurry is then fed to the filter tank 14 which has stationary side members on three sides, and several adjustable dams 16, with a filter cloth bottom 18. The adjustable dams, or gates 16, separate the filter system into three distinct areas, which are respectively the acid slurry filtering area 20, the flood-rinsing filtering area 22, and the final filtering area 24. The active surface area of these filter areas, i.e. the acid slurry filtering area, the flood-rinsing area, and the final filter area is about 7.5 square feet. This allows for a processing rate on the filter of about 200 kg. of phosphor per hour in continuous operation using the present method.

The continuous filter cloth 18 is disposed upon and supported by a continuous rubber belt 26, which has numerous slits in the central portion thereupon to allow for passage of the aqueous portion of the acid slurry and the water wash, as well as very fine phosphor particles carried therewith, under the action of the dynamic vacuum producing means underneath this rubber belt. During operation of the continuous filter device, it is the combination of the slitted rubber belt 26, the filter cloth 18, and the mass of phosphor material supported upon the filter cloth, which acts as the top of the partial vacuum chamber 28, which is provided underneath the filter tank 14. The vacuum chamber 28 is continuously pumped by a dynamic vacuum system 30 to provide a pressure of about 0.6 atmosphere in the vacuum chamber 28 during the filtering operation. The effect of maintaining this partial vacuum in the vacuum chamber 28 is to rapidly force the aqueous portion of the slurry through the filter cloth 18 and the slitted belt 26. The rubber belt 26 is driven by drive means 32 so that the filter cloth is moving at a predetermined rate which is readily adjusted to insure the desired filtration. As the filter cloth is advanced, the aqueous portion of the acid slurry is filtered off. A wet mass of phosphor is formed on the filter cloth 18. The mass is about 1/4 to 1/8 inch thick, and this thickness is readily varied by raising or lowering the movable dam 16 between the acid slurry filter area and the washing filter area. The filter cloth 18 is made for example of a Dacron material woven to filter particles with an average diameter of less than 1 micron. The formed mass of wet phosphor is thus carried on the filter cloth to the water wash section or station of the continuous filter device where deionized water is continuously added to the upper side of the filter, from water source 34 to inundate and flood wash the phosphor material. Here again, the dynamic vacuum producing means operatively associated with the underside of the continuous filter maintains a partial vacuum on the underside of the filter thereby allowing rapid removal of the substantial portion of the wash water. The speed of movement of the filter cloth and the rate of addition of water can be easily varied within the objective of removing the residual acid thoroughly yet quickly. The flood washing is continued until the rinse water drawn through the filter has a pH of at least 4.2, and preferably pH 4.8. This flood washing technique prevents channeling of the washing water and insures thorough uniform washing. The wash water can be reprocessed to recover any fine phosphor particles which are carried through the filter cloth. At the exit end of the continuous filter in the final filter area, the phosphor advances as a wet mass which is discharged from the filter cloth via gravity into the collector 36. The filter cloth which is continuous is returned to its original position in the system for continuing use. Preferably the collected phosphor material then has added thereto additional deionized water to form a slurry having a specific gravity of 1.76 to 1.9. The pH of this slurry is at least greater than 4.2 and is preferably about 4.8. The pH value is a check on the removal of residual acid. The pH value is limited by the fact that the pH of the deionized water which is readily available for the water washing step is about 5.6 to 5.7. It has been discovered that by following the method of the present invention, the pH of the resulting final phosphor slurry is always at least greater than 4.2, with the upper limit being the pH of the deionized water wash. It has been discovered that phosphors prepared by the present treatment method in which the pH value of the final slurry before drying is at least 4.2 result in a superior luminescent material, which when incorporated into a fluorescent lamp exhibits improved luminosity.

The specific gravity of the slurry can be adjusted so that it falls within the range of 1.76 to 1.9 before the slurry is fed through a gas heated spray drying device which serves to dry and separate phosphor particles, and such a spray drying technique is known in the art as shown in U.S. Patent No. 3,023,339, issued Feb. 27, 1962. The phosphor particles are then accumulated in finely divided status. The phosphor is now ready for use in fluorescent lamps.

The present method has several distinctive advantages. The present method allows for a very speedy, continuous operation which avoids local excess acid concentration. Prior art decantation washing of the acid treated phosphor in general required about five times the time required with the present continuous filtration. The pH of the resulting decantation filtered phosphor slurry was consistently below a pH of 4. The lumen output final phosphor measured in lamps after 100 hours' operation was consistently less than that for the phosphor prepared by the present method.

While the invention has been described by way of specific examples it should be understood that the invention is not to be limited thereto or thereby.

We claim:
1. The method of rapidly and efficiently processing finely divided halophosphate phosphor to improve the performance of the fluorescent lamp which incorporates said phosphor, said phosphor having been mixed with an acid washing solution to form a slurry, and said slurry having then been agitated to acid wash said phosphor, which method comprises:
   (a) feeding said slurry onto the upper surface of a continuously moving filter-belt conveyor which forms the bottom of a three-stationed filter-rinsing tank, said upper surface of said continuously moving conveyor initially passing through the first station of said filter-rinsing tank, thence through the second station of said filter-rinsing tank, and finally through the third station of said filter-rinsing tank, the said stations of said filter-rinsing tank separated from one another by dams spaced above said upper surface of said conveyor, said conveyor having dynamic vacuum-producing means operatively associated with the underside thereof to maintain a partial vacuum on said underside thereof to rapidly remove a substantial portion of any liquid medium fed onto said upper surface while leaving said phosphor disposed on said upper surface, and said slurry being fed onto said upper surface as said upper surface passes through said first station to rapidly remove a substantial portion of said acid-washing solution while leaving said phosphor disposed on said upper surface;
   (b) flood-rinsing said phosphor as disposed on said upper surface by flooding said upper surface as it passes through said second station with a substantial volume of deionized water which upon passing through said conveyor has a pH of at least 4.2;
   (c) moving said phosphor as disposed on said upper surface through said third station to effect a final removal of liquid from said phosphor; and
   (d) collecting said phosphor as it passes from said third station.
2. The method as specified in claim 1, wherein said flood-rinsing water has a pH of at least 4.8 as it passes through said conveyor.

References Cited

UNITED STATES PATENTS 3,060,129  10/1962  Hoekstra et al. ____ 252—301.4P

ROBERT D. EDMONDS, Primary Examiner

U.S. Cl. X.R.

252—301.6P